US012563520B2

(12) United States Patent
Liu et al.

(10) Patent No.: US 12,563,520 B2
(45) Date of Patent: Feb. 24, 2026

(54) RETRANSMISSION OF SIDELINK POSITIONING REFERENCE SIGNAL

(71) Applicant: Nokia Technologies Oy, Espoo (FI)

(72) Inventors: Yong Liu, Shanghai (CN); Ryan Keating, Naperville, IL (US); Jun Tan, Naperville, IL (US); Tao Tao, Shanghai (CN); Dong Li, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 330 days.

(21) Appl. No.: 18/254,082

(22) PCT Filed: Dec. 17, 2020

(86) PCT No.: PCT/CN2020/137225
§ 371 (c)(1),
(2) Date: May 23, 2023

(87) PCT Pub. No.: WO2022/126496
PCT Pub. Date: Jun. 23, 2022

(65) Prior Publication Data
US 2024/0007987 A1      Jan. 4, 2024

(51) Int. Cl.
*H04W 64/00*          (2009.01)
*H04L 1/08*           (2006.01)
*H04L 5/00*           (2006.01)

(52) U.S. Cl.
CPC .............. *H04W 64/00* (2013.01); *H04L 1/08* (2013.01); *H04L 5/0051* (2013.01)

(58) Field of Classification Search
CPC ......... H04W 4/02; H04W 4/40; H04W 64/00; H04L 1/08; H04L 5/0051
(Continued)

(56) References Cited

U.S. PATENT DOCUMENTS

| | | | |
|---|---|---|---|
| 12,095,566 B2 * | 9/2024 | Hwang | ................. H04L 1/1812 |
| 2015/0018017 A1 * | 1/2015 | Jang | ........................ G01S 5/145 |
| | | | 455/456.5 |

(Continued)

FOREIGN PATENT DOCUMENTS

CN          111343579 A       6/2020

OTHER PUBLICATIONS

"New WID: NR Positioning Support", 3GPP TSG RAN Meeting #83, RP-190752, Agenda: 9.1.1, Intel Corporation, Mar. 18-21, 2019, 6 pages.

(Continued)

*Primary Examiner* — Joseph Arevalo
(74) *Attorney, Agent, or Firm* — Barta Jones, PLLC

(57) ABSTRACT

Embodiments of the present disclosure relate to devices, methods, apparatuses and computer readable storage media of retransmission of sidelink positioning reference signal (PRS). The method comprises transmitting, to a second device, a first sidelink reference signal associated with a positioning or ranging procedure of the first device; and receiving, from the second device, a second sidelink reference signal associated with the positioning or ranging procedure, the second sidelink reference signal comprising information indicating whether the first sidelink reference signal needs to be retransmitted. In this way, the retransmission of the sidelink PRS can be triggered without extra resource consumption and a fast RTT estimation for sidelink ranging and positioning can be achieved.

6 Claims, 5 Drawing Sheets

(58) Field of Classification Search
USPC .................. 455/456.1, 456.2, 522, 434, 418
See application file for complete search history.

(56) References Cited

U.S. PATENT DOCUMENTS

| | | | | |
|---|---|---|---|---|
| 2019/0260534 | A1 | 8/2019 | Park et al. | |
| 2022/0014872 | A1* | 1/2022 | Balasubramanian | ....................... H04W 4/023 |
| 2022/0279313 | A1* | 9/2022 | Huang | .................. H04L 5/0094 |
| 2022/0321293 | A1* | 10/2022 | Ren | ...................... H04L 5/0048 |
| 2023/0022691 | A1* | 1/2023 | Ji | .......................... H04W 72/02 |
| 2023/0309066 | A1* | 9/2023 | Ganesan | ............... H04W 72/02 |

OTHER PUBLICATIONS

"New SID on NR Positioning Enhancements", 3GPP TSG RAN Meeting #86, RP-193237, Agenda: 9.1.1, Qualcomm Incorporated, Dec. 9-12, 2019, 4 pages.

"C-V2X use cases: methodology, examples, and service level requirements", 5G Automotive Association, White Paper, Version 1.0, Jun. 19, 2019, pp. 1-77.

"Revised SID on Study on scenarios and requirements of in-coverage, partial coverage, and out-of coverage positioning use cases", 3GPP TSG RAN Meeting #89e, RP-201518, Agenda: 9.7.12, LG Electronics, Sep. 14-18, 2020, 4 pages.

International Search Report and Written Opinion received for corresponding Patent Cooperation Treaty Application No. PCT/CN2020/137225, dated Sep. 23, 2021, 8 pages.

"New SID: Study on scenarios and requirements of in-coverage, partial coverage, and out-of-coverage positioning use cases", 3GPP TSG RAN Meeting #88e, RP-201272, Agenda: 9.1, LG Electronics, Jun. 29-Jul. 3, 2020, 4 pages.

"Discussion of sidelink positioning", 3GPP TSG RAN WG1 #101-e, R1-2004609, Agenda: 8.2.4, Huawei, May 25-Jun. 5, 2020, 5 pages.

* cited by examiner

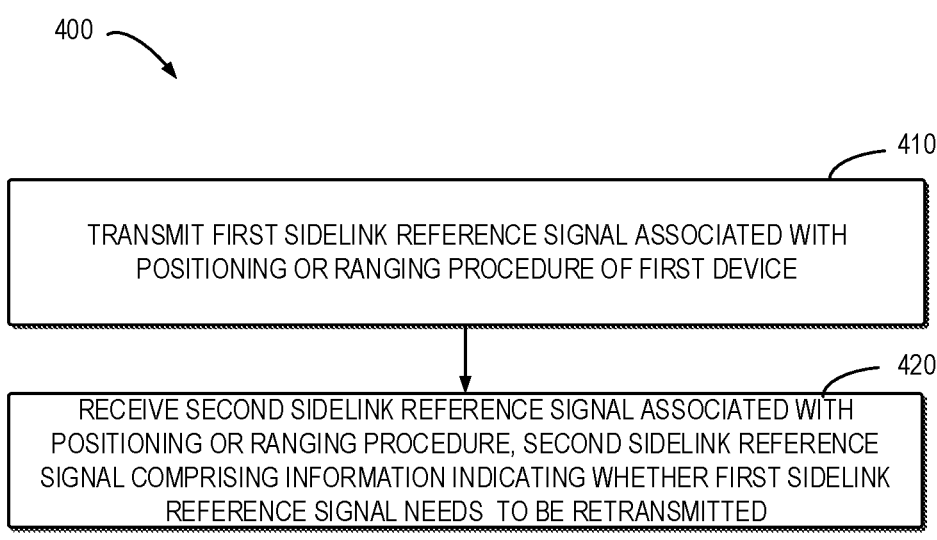

400

410

TRANSMIT FIRST SIDELINK REFERENCE SIGNAL ASSOCIATED WITH POSITIONING OR RANGING PROCEDURE OF FIRST DEVICE

420

RECEIVE SECOND SIDELINK REFERENCE SIGNAL ASSOCIATED WITH POSITIONING OR RANGING PROCEDURE, SECOND SIDELINK REFERENCE SIGNAL COMPRISING INFORMATION INDICATING WHETHER FIRST SIDELINK REFERENCE SIGNAL NEEDS TO BE RETRANSMITTED

FIG. 4

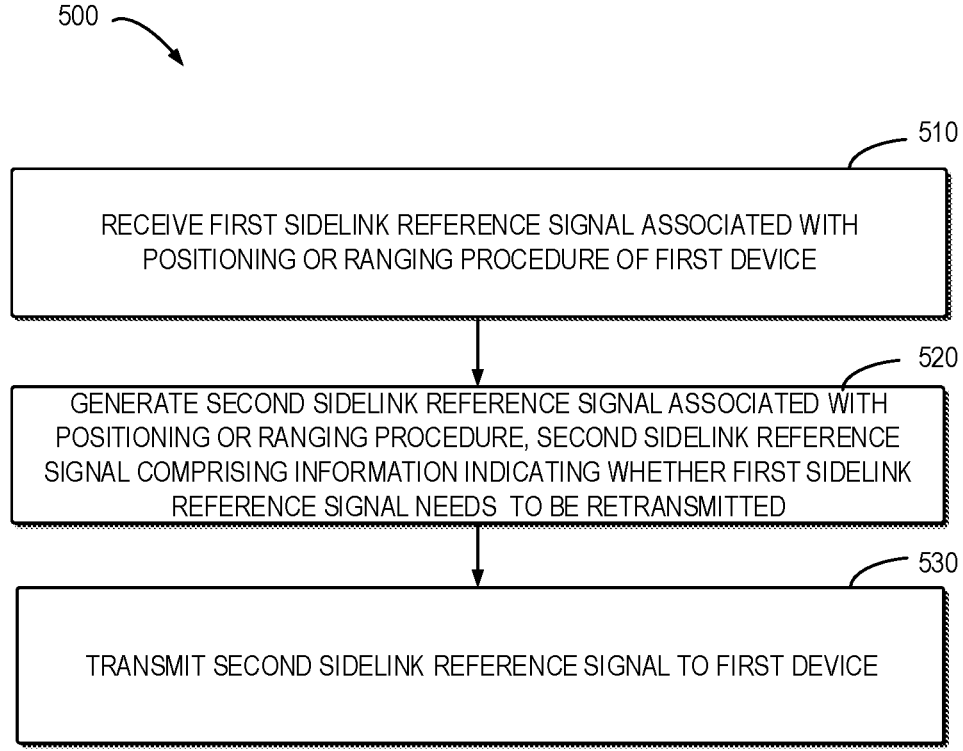

500

510

RECEIVE FIRST SIDELINK REFERENCE SIGNAL ASSOCIATED WITH POSITIONING OR RANGING PROCEDURE OF FIRST DEVICE

520

GENERATE SECOND SIDELINK REFERENCE SIGNAL ASSOCIATED WITH POSITIONING OR RANGING PROCEDURE, SECOND SIDELINK REFERENCE SIGNAL COMPRISING INFORMATION INDICATING WHETHER FIRST SIDELINK REFERENCE SIGNAL NEEDS TO BE RETRANSMITTED

530

TRANSMIT SECOND SIDELINK REFERENCE SIGNAL TO FIRST DEVICE

FIG. 5

RETRANSMISSION OF SIDELINK POSITIONING REFERENCE SIGNAL

RELATED APPLICATION

This application claims priority to PCT Application No. PCT/CN2020/137225 filed Dec. 17, 2020, which is incorporated herein by reference in its entirety.

FIELD

Embodiments of the present disclosure generally relate to the field of telecommunication and in particular to devices, methods, apparatuses and computer readable storage media of retransmission of sidelink positioning reference signal (PRS).

BACKGROUND

Some solutions have been specified for New Radio (NR) positioning in release 16. For example, the solutions may comprise Downlink Time Difference of Arrival (DL-TDOA), Uplink Time Difference of Arrival (UL-TDOA), Downlink Angle of Departure (DL-AoD), Uplink Angle of Arrival (UL-AoA), Enhanced Cell ID (E-CID), and Multi-cell Round Trip Time (Multi-RTT). In release 17, there will be further work on NR positioning with the main target being the Industrial IoT (Internet of Things) use cases.

In release 16, support for Vehicle to Everything (V2X) was also added to NR in the form of sidelink communications. Enhancements to the sidelink are also being made in release 17. As of yet ranging and positioning support have not been added to the sidelink. However, many sidelink use cases may have ranging and positioning requirements.

SUMMARY

In general, example embodiments of the present disclosure provide a solution of retransmission of sidelink PRS.

In a first aspect, there is provided a first device. The first device comprises at least one processor; and at least one memory including computer program codes; the at least one memory and the computer program codes are configured to, with the at least one processor, cause the first device at least to transmit, to a second device, a first sidelink reference signal associated with a positioning or ranging procedure of the first device; and receive, from the second device, a second sidelink reference signal associated with the positioning or ranging procedure, the second sidelink reference signal comprising information indicating whether the first sidelink reference signal needs to be retransmitted.

In a second aspect, there is provided a second device. The second device comprises at least one processor; and at least one memory including computer program codes; the at least one memory and the computer program codes are configured to, with the at least one processor, cause the second device at least to receive, from a first device, a first sidelink reference signal associated with a positioning or ranging procedure of the first device; generate a second sidelink reference signal associated with the positioning or ranging procedure, the second sidelink reference signal comprising information indicating whether the first sidelink reference signal needs to be retransmitted; and transmit the second sidelink reference signal to the first device.

In a third aspect, there is provided a method. The method comprises transmitting, to a second device, a first sidelink reference signal associated with a positioning or ranging procedure of the first device; and receiving, from the second device, a second sidelink reference signal associated with the positioning or ranging procedure, the second sidelink reference signal comprising information indicating whether the first sidelink reference signal needs to be retransmitted.

In a fourth aspect, there is provided a method. The method comprises receiving, from a first device, a first sidelink reference signal associated with a positioning or ranging procedure of the first device; generating a second sidelink reference signal associated with the positioning or ranging procedure, the second sidelink reference signal comprising information indicating whether the first sidelink reference signal needs to be retransmitted; and transmitting the second sidelink reference signal to the first device.

In a fifth aspect, there is provided an apparatus comprising means for transmitting, to a second device, a first sidelink reference signal associated with a positioning or ranging procedure of the first device; and means for receiving, from the second device, a second sidelink reference signal associated with the positioning or ranging procedure, the second sidelink reference signal comprising information indicating whether the first sidelink reference signal needs to be retransmitted.

In a sixth aspect, there is provided an apparatus comprising means for receiving, from a first device, a first sidelink reference signal associated with a positioning or ranging procedure of the first device; means for generating a second sidelink reference signal associated with the positioning or ranging procedure, the second sidelink reference signal comprising information indicating whether the first sidelink reference signal needs to be retransmitted; and means for transmitting the second sidelink reference signal to the first device.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where

FIG. 4 shows a flowchart of an example method of retransmission of sidelink positioning reference signal according to some example embodiments of the present disclosure;

FIG. 5 shows a flowchart of an example method of retransmission of sidelink positioning reference signal according to some example embodiments of the present disclosure;

Throughout the drawings, the same or similar reference numerals represent the same or similar element.

DETAILED DESCRIPTION

Figure 1:
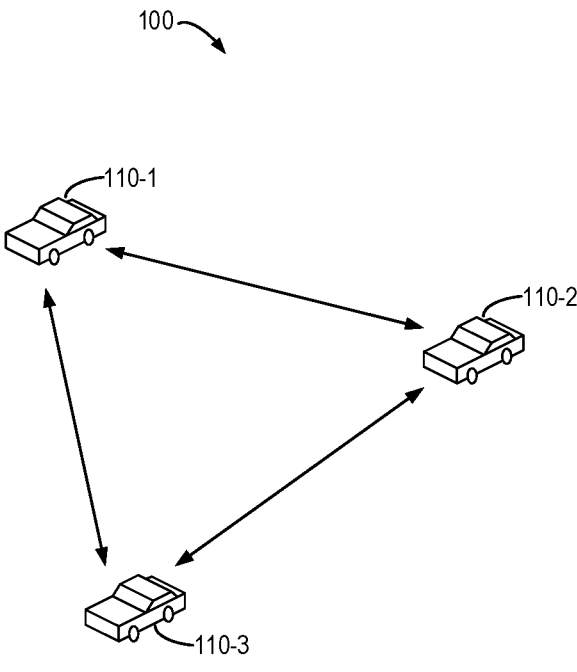
FIG. 1 illustrates an example communication network 100 in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 includes a terminal device 110-1 (hereinafter may also be referred to as a first device 110-1 or a target UE 110-1). The communication network 100 may comprise a terminal devices 110-2 (hereafter may also be referred to as a second device 110-2 or a first supporting UE 110-2) and 110-3 (hereafter may also be referred to as a further second device 110-3 or a second supporting UE 110-3). The terminal devices 110-1, 110-2 and 110-3 may communicate with each other. It is to be understood that the number of terminal devices and network devices are only for the purpose of illustration without suggesting any limitations. The communication network 100 may include any suitable number of terminal devices adapted for implementing embodiments of the present disclosure. In the communication network 100, the target UE 110-1 can also be considered as a supporting UE and the supporting UEs 110-2 and 110-3 can also be considered as a target UE, respectively.

The communication network 100 can be implemented in a scenario of sidelink (SL) communication. In SL communication, the communication between terminal devices (for example, V2V, V2P, V2I communications) can be performed via sidelinks. For SL communication, information may be transmitted from a Transmit (TX) terminal device to one or more Receive (RX) terminal devices in a broadcast, or groupcast, or unicast manner.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As mentioned above, some solutions have been specified for New Radio (NR) positioning in release 16. In release 17, there will be further work on NR positioning with the main target being the Industrial IoT use cases. In release 16, support for V2X was also added to NR in the form of sidelink communications. Enhancements to the sidelink are also being made in release 17. As of yet ranging and positioning have not been supported to the sidelink communication and the positioning work has kept sidelink explicitly out of the scope of the work. Many sidelink use cases have ranging and positioning requirements however (for example, self-driving cars and public safety).

Furthermore, 5G Automotive Association (5GAA) has studied the different positioning technologies that may be used to meet the accuracy requirements in V2X applications. Sidelink positioning has been identified as important to meet high accuracy use cases, especially when Global Navigation Satellite System (GNSS) coverage is not available.

In the conventional way, timing based positioning techniques (e.g., DL-TDOA and multi-RTT) rely on multiple positioning reference signals (PRS) being received at the same time by the target UE. Ranging technique seems like the simplest method to add for V2X positioning. Ranging technique relies on the target device (T-UE) transmitting a signal to a supporting device (S-UE) and then later receiving another reference signal from the supporting device in order to estimate the round trip time (RTT).

On the one hand, the ranging procedure needs to be low latency as this is a key requirement for ranging/positioning applications. That is, high speed UEs need to update the information frequently for it to be useful.

On the other hand, similar as sidelink mode 2 communication, a UE may also need to perform autonomous resource selection for PRS transmission at sidelink. Then there will be unavoidable potential collisions between PRSs transmitted from different UEs. PRSs transmitted from different UEs may be overlapped in same time/frequency resources, which will reduce estimation (e.g. timing estimation) performance based on desired PRS at the associated receiving UE. In addition, collision situations vary over slots and thus are not predictable.

One way to handle the above issue for sidelink ranging/ positioning is to employ retransmissions of PRS from a UE to its corresponding UE. Some approaches can be used to trigger retransmissions of PRS. For example, a sidelink control channel (PSCCH) and associated sidelink data channel (PSSCH) may be used to trigger PRS retransmission. Since a PSCCH/PSSCH occupies a sub-channel (at least 10 PRBs) and most symbols of a slot, this scheme is not resource efficient. Furthermore, since it also takes time for a UE to select suitable resource for extra PSCCH/PSSCH transmission, the scheme causes higher latency.

Moreover, the retransmissions of PRS can be triggered by specifying new Ack/Nack channel, which may need and waste substantial pre-allocated Ack/Nack resources, if we want to specify a fixed mapping relation between Ack/Nack and PRS similar as the mapping relationship between Ack/Nack and PSSCH. On the contrary, if a UE employs autonomous resource selection for Ack/Nack transmission, it also takes time to select suitable resource. Then the scheme causes higher latency.

Therefore, the present disclosure provides solution of the retransmission of the sidelink positioning reference signal. In this solution, the target UE may transmit a reference signal associated with a positioning procedure of the target UE. Once the supporting UE receives the reference signal, the supporting UE may determine whether the quality estimation of the reference signal is satisfied and generate a further reference signal as a feedback based on the result of the quality estimation. Then the supporting UE may transmit the further reference signal to the target UE, to indicate whether the retransmission of the reference signal is to be performed at the target UE. In this way, the retransmission of the sidelink PRS can be triggered without extra resource consumption and a fast RTT estimation for sidelink ranging and positioning can be achieved.

Principles and implementations of the present disclosure will be described in detail as below with reference to FIG. 2, which shows a schematic process retransmission of sidelink PRS. For the purpose of discussion, the process 200 will be described with reference to FIG. 1. The process 200 may involve the target UE 110-1 and the supporting UEs 110-2 and 110-3 as illustrated in FIG. 1.

Figure 2:
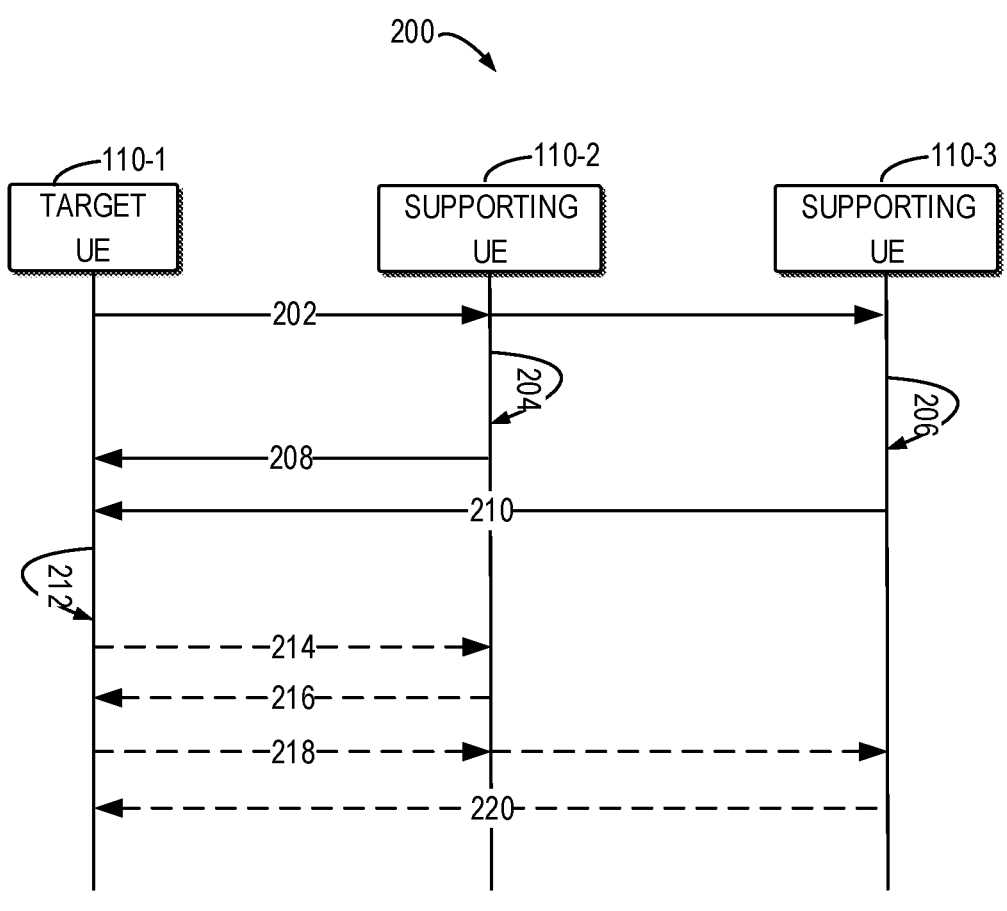
FIG. 2 shows a signaling chart illustrating a process of retransmission of sidelink positioning reference signal according to some example embodiments of the present disclosure.

As shown in FIG. 2, the target UE 110-1 may transmit 202 a first sidelink reference signal associated with a positioning procedure of the target UE 110-1 to one or more supporting UEs on the reserved resources. For example, the first sidelink reference signal can be received by the supporting UEs 110-2 and 110-3. Hereinafter the first sidelink reference signal associated with a positioning procedure of the target UE 110-1 can be referred to as the sidelink positioning reference signal (PRS). It is to be understood that other suitable reference signal can also be used as the first reference signal associated with a positioning procedure.

After receiving the first sidelink PRS from the target UE 110-1, the supporting UEs 110-2 and 110-3 may respond with other sidelink PRS, respectively, to realize measurements of RTTs (round trip time) between the target UE 110-1 and each of the supporting UEs 110-2 and 110-3. For generating the responding sidelink PRS, the supporting UE 110-2 may perform 204 a quality estimation of the first sidelink PRS, for example, based on the correlation value between the received first sidelink PRS and (pre)configured local reference signal. The supporting UE 110-3 may also perform 206 a quality estimation of the first sidelink PRS. Based on the quality estimation, the supporting UEs 110-2 and 110-3 may generate the responding sidelink PRS, respectively.

During the quality estimation procedure, the supporting UEs 110-2 and 110-3 may compare the result of the quality estimation with a threshold value. If the result of the quality estimation exceeds the threshold value, the supporting UEs 110-2 and 110-3 may generate 204, 206 a second sidelink PRS comprising information indicating the quality estimation is satisfied. If the result of the quality estimation is lower the threshold value, the supporting UEs 110-2 and 110-3 may generate a second sidelink PRS comprising information indicating the quality estimation is unsatisfied. The second sidelink PRS indicating satisfied quality estimation or unsatisfied quality estimation may occupy the same time/frequency resources but employ different sequences. The second sidelink PRSs from different supporting UEs may occupy different frequency resources (different comb offsets) in the same slot.

In some example embodiments, if the supporting UE 110-2 or 110-3 determines that the result of the quality estimation exceeds the threshold value, the supporting UE 110-2 or 110-3 may generate a first sequence indicating the quality estimation is satisfied. If the supporting UE 110-2 or 110-3 determines that the result of the quality estimation is lower the threshold value, the supporting UE 110-2 or 110-3 may generate a second sequence indicating the quality estimation is unsatisfied.

Then the supporting UE 110-2 may transmit 208 the generated second sidelink PRS to the target UE 110-1, and the supporting UE 110-3 may also transmit 210 the further second sidelink PRS to the target UE 110-1. Based on the received second sidelink PRS or the further second sidelink PRS, in addition to the timing estimation, the target UE 110-1 may determine 212 whether the first sidelink PRS is to be retransmitted.

The sidelink PRS (for example, the first and the second sidelink PRS as described above) is mainly used for timing estimation for ranging or positioning. It is to be understood that the sidelink PRS may not be limited to timing estimation. Other estimation types such as angle estimation can also be applied.

Figure 3A:
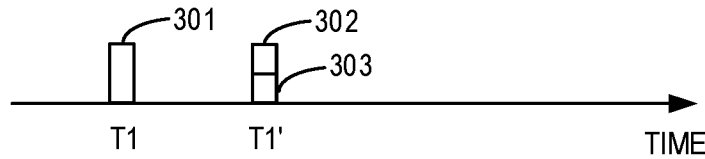
FIG. 3A-3C show examples of retransmission of sidelink positioning reference signal according to some example embodiments of the present disclosure.
Figure 3B:
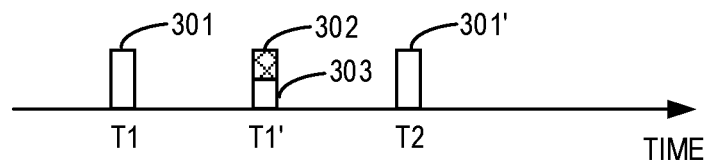
Figure 3C:
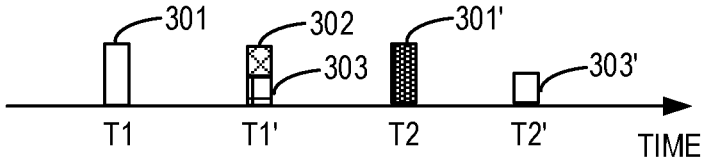

FIG. 3A-3C show examples of the retransmission of sidelink PRS according to some example embodiments of the present disclosure. As shown in FIG. 3A, the target UE 110-1 may transmit a first sidelink PRS 301 in the slot T1 on the reserved resources. In the slot T1', the target UE 110-1 may receive, for example, a second sidelink PRS 302 from the supporting UE 110-2 and a further second sidelink PRS 303 from the supporting UE 110-3. If both the second sidelink PRS 302 and the further second sidelink PRS 303 indicate the result of the quality estimation of the first sidelink PRS is satisfied, the target UE 110-1 may determine that the first sidelink PRS is not to be retransmitted.

In some example embodiments, as shown in FIG. 3B, the target UE 110-1 may transmit a first sidelink PRS 301 in the slot T1 on the reserved resources. In the slot T1', the target UE 110-1 may receive, for example, a second sidelink PRS 302 from the supporting UE 110-2 and a further second sidelink PRS 303 from the supporting UE 110-3. If the target UE 110-1 determines that one of the second sidelink PRS 302 and the further second sidelink PRS 303 indicates the result of the quality estimation of the first sidelink PRS is unsatisfied, the target UE 110-1 may perform the retransmission of the first sidelink PRS.

For example, if the second sidelink PRS 302 indicates the result of the quality estimation of the first sidelink PRS is unsatisfied and the further second sidelink PRS 303 indicates the result of the quality estimation of the first sidelink PRS is satisfied, the target UE 110-1 may retransmit the first sidelink PRS at slot T2. Referring back to FIG. 2, for example, the target UE 110-1 may retransmit 214 the first sidelink PRS to the supporting UE 110-2. Then the supporting UE 110-2 may perform the quality estimation of the first sidelink PRS and respond 216 to the first sidelink PRS with a new sidelink reference signal indicating the result of the quality estimation.

In some example embodiments, as shown in FIG. 3C, the target UE 110-1 may transmit a first sidelink PRS 301 in the slot T1 on the reserved resources. In the slot T1', the target UE 110-1 may receive, for example, a second sidelink PRS 302 from the supporting UE 110-2 and a further second sidelink PRS 303 from the supporting UE 110-3. If the second sidelink PRS 302 or the further second sidelink PRS 303 indicates the result of the quality estimation of the first sidelink PRS is unsatisfied, as mentioned above, the target UE 110-1 may perform the retransmission of the first sidelink PRS 301' at slot T2.

Furthermore, the target UE 110-1 may also perform quality estimation for the second sidelink PRS received from the supporting UE 110-2 or the further second sidelink PRS received from the supporting UE 110-3. For example, if the target UE 110-1 determines that the result of quality estimation of the further second sidelink PRS 303 is unsatisfied, the target UE 110-1 may generate an indication for the supporting UE 110-3 to retransmit the further second sidelink PRS. For example, the target UE 110-1 may generate the indication based on the index of the supporting UE 110-3. Then the target UE 110-1 may transmit the indication to the supporting UE 110-3 during the retransmission of the first sidelink PRS 301' at slot T2. The target UE 110-1 may further receive responding sidelink PRS 303' from supporting UE 110-3 at slot T2'.

In general, if the target UE 110-1 receives sidelink PRS from N supporting UEs, the target UE 110-1 may acquire timings with the knowledge of estimation qualities corresponding to N PRSs. Based on the estimation qualities, the target UE 110-1 may transmit different sidelink PRSs at T2, such as PRS_t(sqn1), PRS_t(sqn2), . . . , PRS_t(sqnM) $(M=2^N)$. A binary number (N bit) is constructed with each bit representing whether or not the next retransmission of sidelink PRS from a supporting UE is needed. The decision on whether or not the next retransmission is needed is mainly decided by the estimation quality corresponding to the PRS from this supporting UE. For example, the first bit may represent whether or not the next retransmission of PRS from supporting UE 110-2 is needed, and so on. For example, "1" may represent the retransmission is needed and "0" may represent the retransmission is not needed.

Referring back FIG. 2, if the target UE 110-1 determines, based on the second sidelink PRS received from the supporting UE 110-2, that the result of the quality estimation of the first sidelink PRS is unsatisfied, and the target UE 110-1 also determines the result of the quality estimation of the further second sidelink PRS received from the supporting UE 110-3 is unsatisfied, the target UE 110-1 may retransmit 218 the first sidelink PRS including indication that the retransmission of sidelink PRS from supporting UE 110-3 is needed. After receiving the retransmitted first sidelink PRS, the supporting UE 110-3 may transmit 220 the responding sidelink PRS to the target UE 110-1.

In general, the solution proposed in the present disclosure can be suitable for both ranging and positioning procedure. In a ranging procedure, a target UE and a supporting UE may be involved. A target UE (for example, the target UE 110-1 shown in FIG. 1) may transmit a sidelink PRS to a supporting UE (for example, the supporting UE 110-2 or 110-3 shown in FIG. 1). The supporting UE may perform quality estimation for the sidelink PRS received from the target UE and generate a further sidelink PRS based on the result of the quality estimation. The supporting UE may transmit the further sidelink PRS to the target UE to indicate whether the sidelink PRS needs to be retransmitted.

In a positioning procedure, a target UE and at least three supporting UEs may be involved. A target UE (for example, the target UE 110-1 shown in FIG. 1) may transmit a sidelink PRS to at least three supporting UEs (for example, the supporting UE 110-2 or 110-3 shown in FIG. 1). Each supporting UE may perform quality estimation for the sidelink PRS received from the target UE individually and generate a further sidelink PRS based on the result of the quality estimation, respectively. Each supporting UE may transmit the further sidelink PRS to the target UE to indicate whether the sidelink PRS needs to be retransmitted. If the further sidelink PRSs from at least three supporting UEs indicate the result of the quality estimation of the sidelink PRS is satisfied, the target UE 110-1 may determine that the sidelink PRS is not to be retransmitted. Otherwise, the target UE 110-1 may perform the retransmission of the sidelink PRS.

In this way, the retransmission of the sidelink PRS can be triggered without extra resource consumption and a fast RTT estimation for sidelink ranging and positioning can be achieved.

FIG. 4 shows a flowchart of an example method 400 of retransmission of sidelink PRS according to some example embodiments of the present disclosure. The method 400 can be implemented at a first device 110-1 as shown in FIG. 1. For the purpose of discussion, the method 400 will be described with reference to FIG. 1.

At 410, the first device transmits, to a second device, a first sidelink reference signal associated with a positioning or ranging procedure of the first device.

In some example embodiments, the first device may receive one of the following: a first sequence indicating a quality estimation result of the first sidelink reference signal is satisfied; or a second sequence indicating the quality estimation result of the first sidelink reference signal is unsatisfied.

At 420, the first device receives, from the second device, a second sidelink reference signal associated with the positioning or ranging procedure, the second sidelink reference signal comprising information indicating whether the first sidelink reference signal needs to be retransmitted.

In some example embodiments, if the first device determines, based on the second sidelink reference signal, that a quality estimation result of the first sidelink reference signal is satisfied, the first device may quit the retransmission of the first sidelink reference signal.

In some example embodiments, if the first device determines, based on the second sidelink reference signal, that a quality estimation result of the first sidelink reference signal is unsatisfied, the first device may perform the retransmission of the first sidelink reference signal.

In some example embodiments, if the first device determines a further quality estimation result of a further second sidelink reference signal received from a further second device is unsatisfied, the first device may generate an indication for the further second device to retransmit the further second sidelink reference signal and transmit the indication to the further second device during the retransmission of the first sidelink reference signal.

In some example embodiments, the first device may determine an index of the further second device; and generating the indication based on the index.

In some example embodiments, the first device comprises a sidelink terminal device and the second device comprises a sidelink terminal device.

FIG. 5 shows a flowchart of an example method 500 of retransmission of sidelink PRS according to some example embodiments of the present disclosure. The method 500 can be implemented a second device 110-2 or a further second device 110-3 as shown in FIG. 1. For the purpose of discussion, the method 500 will be described with reference to FIG. 1.

At 510, the second device receives, from a first device, a first sidelink reference signal associated with a positioning or ranging procedure of the first device.

At 520, the second device generates a second sidelink reference signal associated with the positioning or ranging procedure, the second sidelink reference signal comprising information indicating whether the first sidelink reference signal needs to be retransmitted.

At 530, the second device transmits the second sidelink reference signal to the first device.

In some example embodiments, the second device may determine a quality estimation result of the first sidelink reference signal. If the second device determines that the quality estimation result of the first sidelink reference signal exceeds a threshold value, the second device may generate a first sequence indicating the quality estimation result is satisfied. The second device may further generate the second sidelink reference signal based on the first sequence.

In some example embodiments, if the second device determines that the quality estimation result of the first sidelink reference signal is lower than the threshold value, the second device may generate a second sequence indicating the quality estimation result is unsatisfied and generate the second sidelink reference signal based on the second sequence.

In some example embodiments, the first device comprises a sidelink terminal device and the second device comprises a sidelink terminal device.

In some example embodiments, an apparatus capable of performing the method 400 (for example, implemented at the first device 110-1) may comprise means for performing the respective steps of the method 400. The means may be implemented in any suitable form. For example, the means may be implemented in a circuitry or software module.

In some example embodiments, the apparatus comprises means for transmitting, to a second device, a first sidelink reference signal associated with a positioning or ranging procedure of the first device; and means for receiving, from the second device, a second sidelink reference signal associated with the positioning or ranging procedure, the second sidelink reference signal comprising information indicating whether the first sidelink reference signal needs to be retransmitted.

In some example embodiments, an apparatus capable of performing the method 500 (for example, implemented at a second device 110-2 or a further second device 110-3) may comprise means for performing the respective steps of the method 500. The means may be implemented in any suitable form. For example, the means may be implemented in a circuitry or software module.

In some example embodiments, the apparatus comprises means for receiving, from a first device, a first sidelink reference signal associated with a positioning or ranging procedure of the first device; means for generating a second sidelink reference signal associated with the positioning or ranging procedure, the second sidelink reference signal comprising information indicating whether the first sidelink reference signal needs to be retransmitted; and means for transmitting the second sidelink reference signal to the first device.

Figure 6:
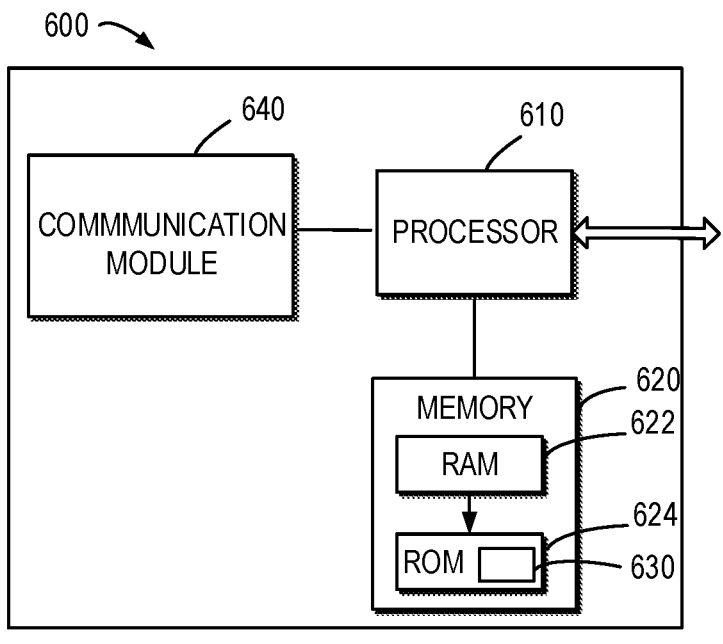
FIG. 6 shows a simplified block diagram of a device that is suitable for implementing example embodiments of the present disclosure.

FIG. 6 is a simplified block diagram of a device 600 that is suitable for implementing embodiments of the present disclosure. The device 600 may be provided to implement the communication device, for example the target UE 110-1 or the supporting UE 110-2 or 110-3 as shown in FIG. 1. As shown, the device 600 includes one or more processors 610, one or more memories 620 coupled to the processor 610, and one or more transmitters and receivers (TX/RX) 640 coupled to the processor 610.

The TX/RX 640 is for bidirectional communications. The TX/RX 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 620. The processor 610 may perform any suitable actions and processing by loading the program 630 into the RAM 620.

The embodiments of the present disclosure may be implemented by means of the program 630 so that the device 600 may perform any process of the disclosure as discussed with reference to FIGS. 2-5. The embodiments of the present disclosure may also be implemented by hardware or by a combination of software and hardware.

Figure 7:
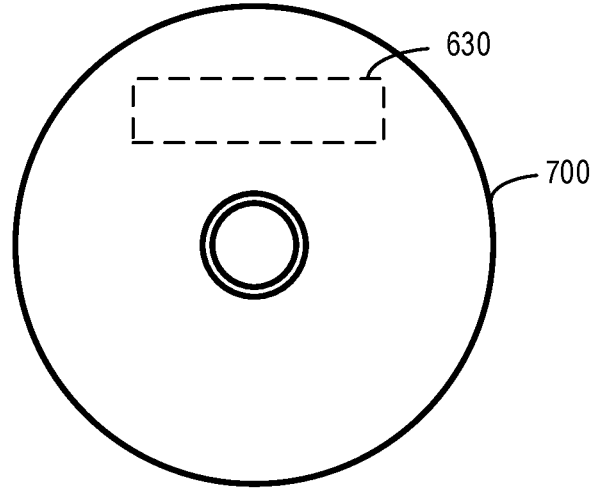
FIG. 7 shows a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 500 as described above with reference to FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus, comprising:
at least one processor; and
at least one memory including computer program code;
the at least one memory and the computer program code being configured to, with the at least one processor, cause the apparatus at least to:
transmit, to another apparatus, a first sidelink reference signal associated with a positioning or ranging procedure of the apparatus;
receive from the other apparatus, a second sidelink reference signal associated with the positioning or ranging procedure, the second sidelink reference signal comprising information indicating whether the first sidelink reference signal needs to be retransmitted;
in accordance with a determination, based on the second sidelink reference signal, that a quality estimation result of the first sidelink reference signal is unsatisfied, perform the retransmission of the first sidelink reference signal, wherein performing the retransmission comprises:
in accordance with a determination that a further quality estimation result of a further second sidelink reference signal received from a further apparatus is unsatisfied, generating an indication for the further apparatus to retransmit the further second sidelink reference signal, wherein generating the indication comprises:
determining an index of the further apparatus; and
generating the indication based on the index; and
transmitting the indication to the further apparatuse during the retransmission of the first sidelink reference signal.

2. The apparatus of claim 1, wherein the apparatus comprises a sidelink terminal device and the other apparatus comprises another sidelink terminal device.

3. A second apparatus comprising:
at least one processor; and
at least one memory including computer program codes;
the at least one memory and the computer program codes being configured to, with the at least one processor, cause the second apparatus at least to:
receive, from a first apparatus, a first sidelink reference signal associated with a positioning or a ranging procedure of the first apparatus;

determine a quality estimation result of the first sidelink reference signal;

based on the quality estimation result, the second apparatus is further caused to:

determine whether the quality estimation result exceeds a threshold value;

based on the determination that the quality estimation result exceeds the threshold value, generate the second sidelink reference signal based on a first sequence that corresponds to a satisfied quality estimation result for the first sidelink reference signal; and based on the determination that the quality estimation result is lower than the threshold value, generate the second sidelink reference signal based on a second sequence that corresponds to an unsatisfied quality estimation result for the first sidelink reference signal; and transmit the second sidelink reference signal to the first apparatus.

4. The second apparatus of claim 3, wherein the second apparatus comprises a sidelink terminal device and the first apparatus comprises another sidelink terminal device.

5. A method performed by a first device, the method comprising:

transmitting, to a second device and a third device, a first sidelink reference signal associated with a positioning or a ranging procedure of the first device;

receiving, from the second device, a second sidelink reference signal associated with the positioning or the ranging procedure, the second sidelink reference signal comprising information indicating whether the first sidelink reference signal needs to be retransmitted;

in accordance with a determination, based on the second sidelink reference signal, that a quality estimation result of the first sidelink reference signal is unsatisfied, perform the retransmission of the first sidelink reference signal, wherein performing the retransmission comprises:

in accordance with a determination that a further quality estimation result of a further second sidelink reference signal received from a further second device is unsatisfied, generating an indication for the further second device to retransmit the further second sidelink reference signal, wherein generating the indication comprises:

determining an index of the further second device; and generating the indication based on the index; and transmitting the indication to the further second device during the retransmission of the first sidelink reference signal.

6. The method of claim 5, wherein the first device comprises a sidelink terminal device and the further second device comprises another sidelink terminal device.

* * * * *